May 7, 1929.  W. T. DAVIS  1,712,259
EXTRUSION PRESS FOR THE MANUFACTURE OF COLLAPSIBLE METAL TUBES
Filed May 15, 1928  2 Sheets-Sheet 1
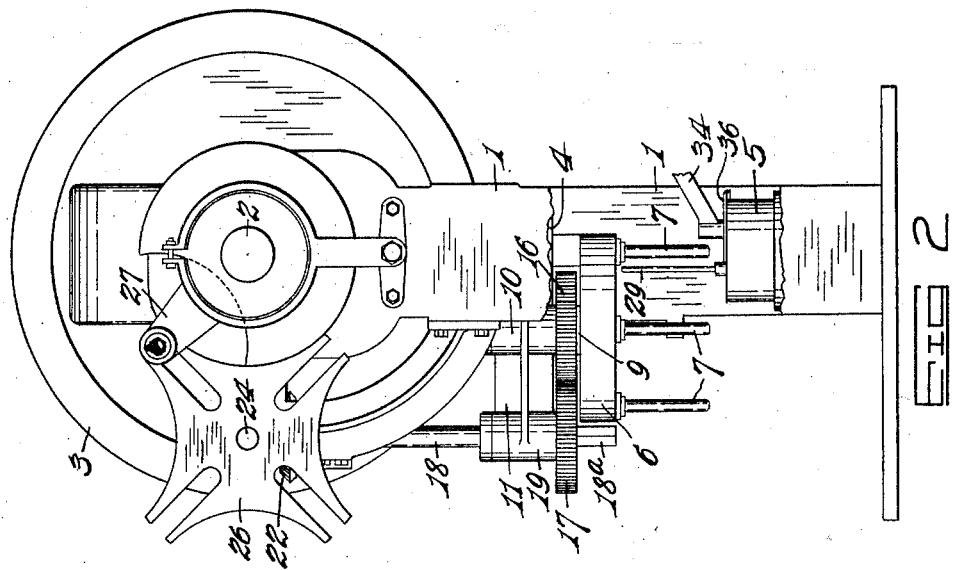
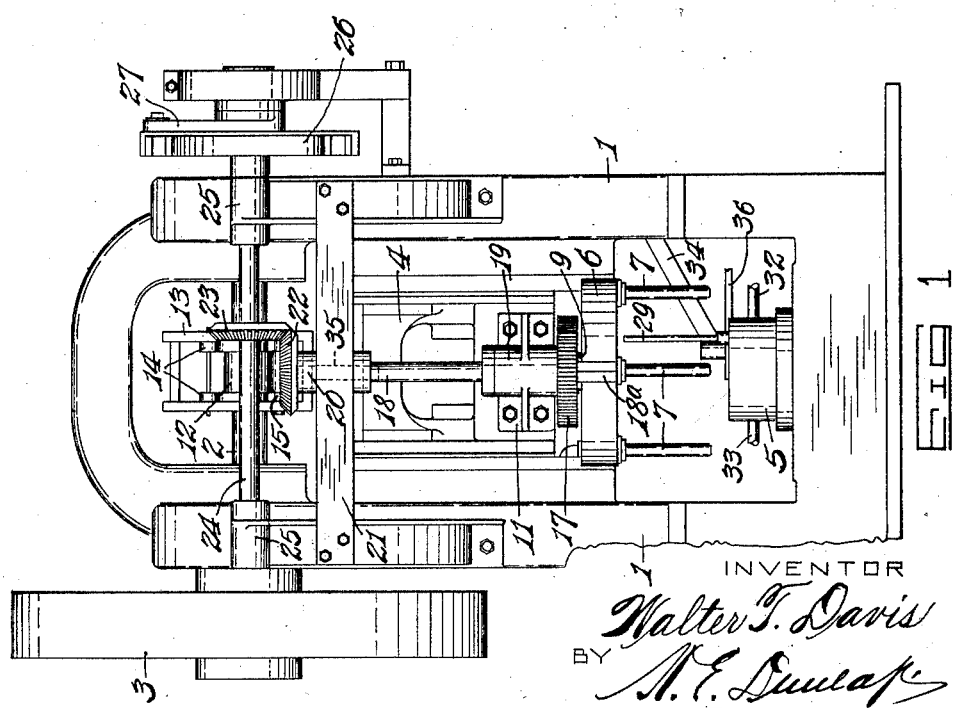
INVENTOR
Walter T. Davis
BY
N. E. Dunlap
ATTORNEY May 7, 1929.  W. T. DAVIS  1,712,259
EXTRUSION PRESS FOR THE MANUFACTURE OF COLLAPSIBLE METAL TUBES
Filed May 15, 1928  2 Sheets-Sheet 2
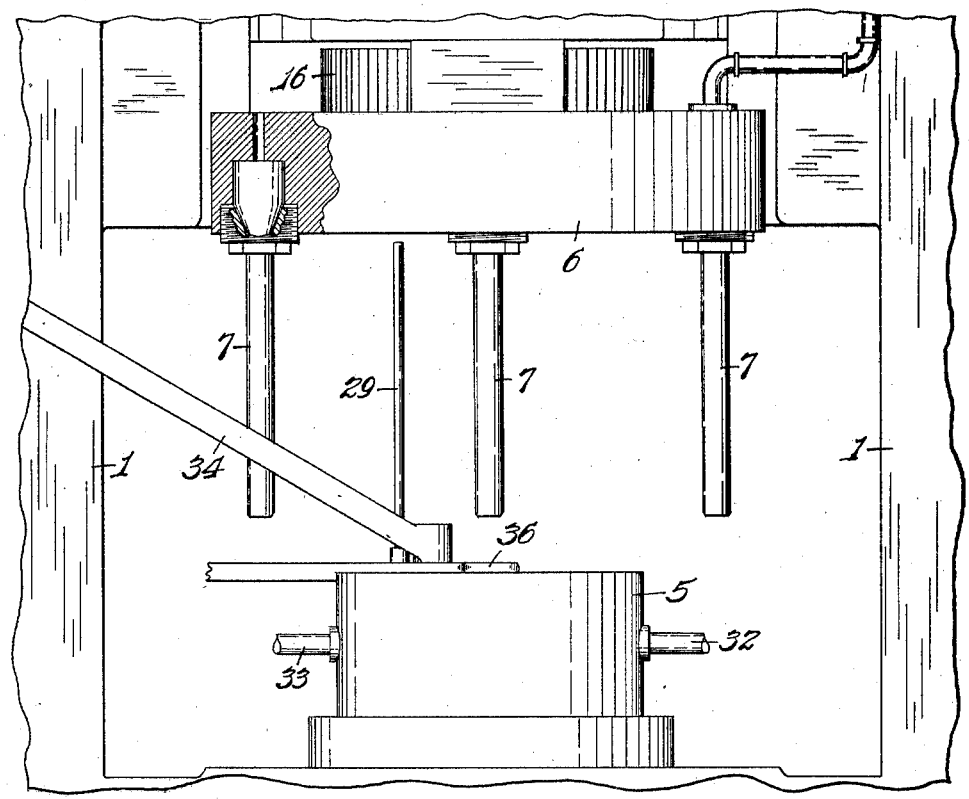
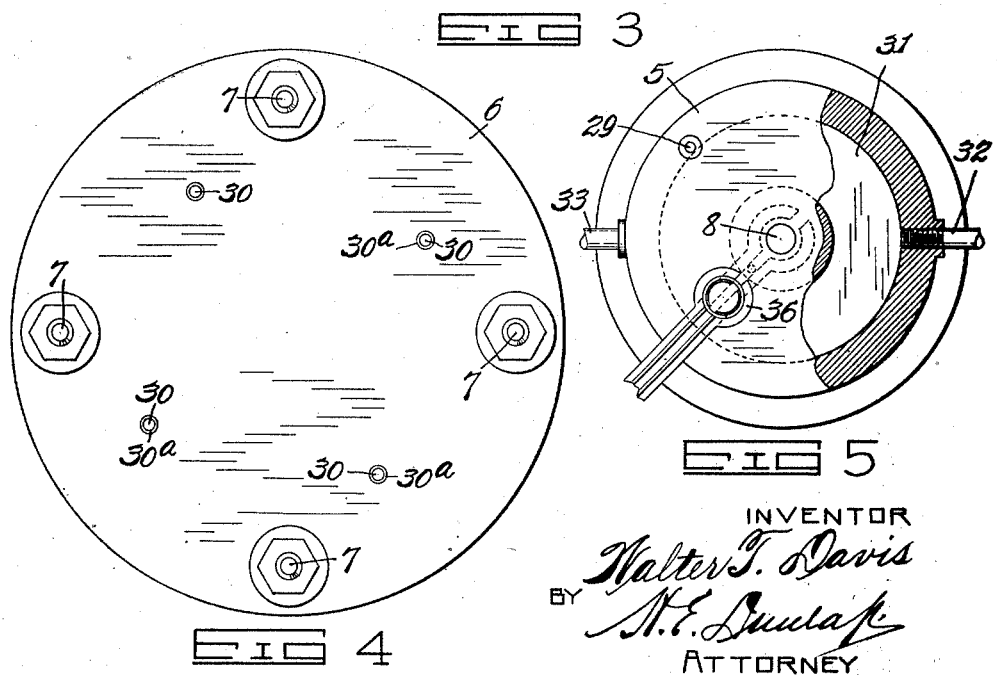
INVENTOR
Walter T. Davis
BY
N. E. Dunlap
ATTORNEY Patented May 7, 1929.

1,712,259

UNITED STATES PATENT OFFICE.

WALTER T. DAVIS, OF WHEELING, WEST VIRGINIA, ASSIGNOR TO WHEELING STAMPING COMPANY, OF WHEELING, WEST VIRGINIA, A CORPORATION OF WEST VIRGINIA.

EXTRUSION PRESS FOR THE MANUFACTURE OF COLLAPSIBLE METAL TUBES.

Application filed May 15, 1928. Serial No. 277,817.

This invention relates broadly to metal extrusion apparatus, and more specifically to a press for the manufacture of collapsible metal tubes.

The extrusion presses heretofore employed in the manufacture of collapsible metal tubes have uniformly embodied a single plunger, or punch, which, due to the arduous work imposed thereon in effecting the extrusion of the metal and to the resultant development of heat, could be operated only at a comparatively low rate of speed, as for producing approximately thirty five tubes per minute. Any marked increase in the rate of operation above that stated is impracticable because of the resultant overheating of the punch.

The primary object of the present invention is to provide a press embodying a plurality of punches and associated mechanism whereby said punches may be operated in relatively rapid succession, thereby materially to increase the capacity of the press and to permit a sufficient interval of time to elapse between successive operations of each punch to prevent the objectionable overheating referred to.

In describing the invention in detail, reference is herein had to the accompanying drawings, in which—

Figure 1 is a front elevation of an extrusion press embodying my invention;

Figure 2 is a side elevation of the same with part of the frame broken away to show the punches and punch-carrying head;

Figure 3 is an enlarged elevation of the head and die with some of the associated parts;

Figure 4 is an under face view of the punch carrying head; and—

Figure 5 is a view of the die, partly in top plan and partly in section.

Referring to said drawings, 1 designates the side members of the frame, 2 the drive shaft, 3 the belt wheel, and 4 the reciprocating slide of a power press of a type commonly employed in the manufacture of collapsible extruded tubes. Said slide is actuated to reciprocate at regular intervals by means of a crank or cam mechanism (not shown) which is interposed between it and the drive shaft, as ordinarily, such reciprocating movement serving to lower the punch-carrying head borne by said slide into and out of cooperative relation to the usual stationary tube-forming die 5.

In the present invention, the head 6 has mounted in its under face adjacent to its circumferential edge a plurality of relatively spaced vertical punches 7, and said head is so arranged that it is rotatable between reciprocations thereof for positioning said punches successively in alined registering relation to a shallow socket or seat 8 provided in the die 5 and wherein are successively received the disk-like slugs of metal which are to be extruded into tube form.

The head 6 is carried by a shaft 9 which is journaled for rotation in a bearing 10 formed on a bracket 11 which is rigidly mounted upon the reciprocable slide 4, and said slide is actuated in any appropriate or usual manner, as through a cam 12 fixed on the drive shaft 2, a saddle 13 carrying upper and lower sets of rollers 14 and 15, and a connecting rod or pitman 35 which connects the press slide 4 to the saddle.

The mechanism whereby the punch-carrying head 6 is rotated for successively positioning the punches 7 in registering relation to the seat 8 in the die 5 comprises a gear wheel 16 fixed on the head-carrying shaft 9. Said gear has disposed in driving relation thereto a similar gear 17 which is slidable on the lowered squared end portion 18$^a$ of a vertical shaft 18 journaled in bearings 19 and 20, of which the bearing 19 is formed on the bracket 11 and the bearing 20 is carried by a suitable part of the frame structure, as upon an appropriately located cross member 21 attached to the frame of the press. Said shaft 18 has fixed on its upper end a bevel gear 22 which is driven by a similar gear 23 fixed on a transverse shaft 24 which is journaled in bearings 25 formed on the press frame in a position forward of the drive shaft 2.

Fixed on the shaft 24 at a suitable point, as upon one end thereof, is a Geneva gear 26 through which intermittent rotary movements throughout a definite distance are imparted to said shaft 24. As herein shown, said Geneva gear is designed intermittently to impart to said shaft quarter turns whereby, through the intermediate mechanism hereinbefore described, is communicated to the head 6 quarter revolutions in which four regularly spaced punches 7 are successively disposed in operative positions relative to the seat 8 of the die.

The drive shaft 2 has fixed thereon a crank arm 27 carrying a pin or roller which, in each revolution of said drive shaft, engages and rotates said Geneva gear throughout one-fourth of a revolution, such rotary movement being timed to fall between successive reciprocating cycles of the press slide 4 and punch-carrying head 6.

The spur gear 17 is shiftable on the squared end 18$^a$ of the shaft 18 with the reciprocating movements of the bracket 11 carried by the press slide 4.

An upright post 29 mounted on the die 5 in a suitable off-center position is designed so to guide the descending head 6 in each reciprocation thereof that the thereby carried punches successively are accurately positioned, or centered, relative to the seat in the die, said post cooperating with properly positioned guide holes 30 which are provided in said head and which preferably have tapered countersinks or enlarged lead passages 30$^a$ at their outer ends, as shown in Fig. 4.

The die 5 is cored, as shown at 31, for the passage of a stream of water whereby is absorbed excess heat generated in operation. Water is conducted to and from the passage 31 through inlet and discharge pipes 32 and 33, respectively.

The slugs are supplied through a gravity chute 34 to a position overlying the die, whence they are successively advanced to a position within the seat 8 by means of automatically shiftable feed mechanism, or tongs 36, as ordinarily.

Due to the fact that the punches are utilized successively in the tube forming operations, the press may manifestly be operated at relatively high speed, thereby to triple, or even to quadruple, its capacity over that of prior machines embodying a single punch, without increasing the tendency of such punches to become overheated.

What is claimed is—

1. In a machine of the character described, the combination with an extrusion press having a slide, a die, a drive shaft, and means intermediate said shaft and said slide for reciprocating the latter relative to said die, of a head journaled for rotation on and bodily movable with said slide, a plurality of relatively spaced punches carried by said head, and means interposed between said shaft and said head whereby rotary movements are imparted to the latter for positioning said punches successively in operative relation to said die.

2. In a machine of the character described, the combination with an extrusion press having a slide, a die, a drive shaft, and means intermediate said shaft and bodily movable with said slide for reciprocating the latter relative to said die, of a head journaled for rotation on said slide, a plurality of relatively spaced punches carried by said head, and means including Geneva gearing interposed between said shaft and said head for imparting definite rotary movements to the latter whereby said punches are successively positioned in operative relation to said die.

3. A press of the character described comprising, in combination with a die, a slide, and means for reciprocating said slide relative to said die; a rotary head carried by and bodily movable with said slide, a plurality of extrusion punches carried by said head, and means for intermittently rotating said head between downward reciprocating movements thereof to position said punches successively in operative relation to said die.

4. A press of the character described comprising, in combination with a die, a slide, and means for reciprocating said slide relative to said die; a rotary head carried by and bodily movable with said slide, a plurality of extrusion punches carried by said head, and means for intermittently rotating said head between downward reciprocating movements thereof to position said punches successively in operative relation to said die, said head-rotating means including a Geneva gearing.

5. In a press of the character described, the combination with a die having a seat therein, a drive shaft, a slide, and means actuated by said shaft for reciprocating said slide, of a rotary head carried by and bodily movable with said head, and intermittent gearing interposed between said shaft and said head whereby the latter is actuated to rotate for presenting said punches successively in alined relation to said seat.

6. In a press of the character described, the combination with a die having a seat therein, a drive shaft, a slide, means actuated by said shaft for reciprocating said slide, of a rotary head carried by and bodily movable with said slide, a plurality of punches carried by said head, a gear in fixed relation to said head, a vertical shaft having shiftable thereon a gear which constantly occupies driving relation to the first mentioned gear, and means including Geneva gearing interposed between said drive shaft and said vertical shaft whereby the latter is rotated intermittently throughout definite fractions of a revolution to position said punches successively in alined relation to said seat.

7. In a press of the character described, the combination with a die having a seat therein, a drive shaft, a slide, and means actuated by said shaft for reciprocating said slide, of a rotary head carried by and bodily movable with said slide, a plurality of punches carried by said head, a gear in fixed relation to said head, a vertical shaft having shiftable thereon a gear which constantly occupies driving relation to the first mentioned gear, a transverse shaft, drive gearing between said transverse shaft and said vertical shaft, a Geneva gear carried by said transverse shaft, a crank arm carried by the drive shaft, and a roller carried by said crank arm for operatively engaging said Geneva gear.

8. In an extrusion device having reciprocal means, a series of spaced punches, carrier means for the punches, means to mount the carrier means on the reciprocal means for bodily movement therewith and for rotary movement independent of the movement of the reciprocal means, a die, and means for actuating the reciprocal means and for effecting rotation of the carrier means so as to successively position the punches in operative relation to the die.

9. In an extrusion device having reciprocal means, a series of spaced punches, carrier means for the punches, means to mount the carrier means on the reciprocal means for bodily movement therewith and for rotary movement independent of the movement of the reciprocal means, a fixed die, and means for actuating the reciprocal means and for also effecting rotation of the carrier means so as to successively position the punches in operative relation to the die.

In testimony whereof, I affix my signature.

WALTER T. DAVIS.